FIG: 1

United States Patent Office 3,573,897
Patented Apr. 6, 1971

3,573,897
IRON-NICKEL ALLOYS HAVING A HIGH
NICKEL CONTENT
Xavier Wache, Sauvigny-les-Bois, France, assignor to
Société des Forges et Ateliers du Creusot, Paris, France
Original application July 11, 1967, Ser. No. 652,484.
Divided and this application Dec. 16, 1969, Ser.
No. 885,502
Claims priority, application France, July 12, 1966,
69,164
Int. Cl. C22c 39/40, 39/50, 39/54
U.S. Cl. 75—123          2 Claims

ABSTRACT OF THE DISCLOSURE

The weldability of iron-nickel alloys with a nickel content higher than 30% in weight is improved by introducing into the alloy an addition of at least one of the elements vanadium, titanium, zirconium and niobium. These elements form nitrides with the nitrogen present in the alloy.

CROSS-REFERENCE TO RELATED APPLICATION

This application is a division of my application Ser. No. 652,484, filed July 11, 1967, for Iron-Nickel Alloys Having a High Nickel Content, now abandoned and is filed in view of a requirement for restriction therein.

BACKGROUND OF THE INVENTION

The present invention relates to iron-nickel alloys having a high nickel content.

The storage and transport of liquefied gases, such as methane, require the construction of large containers made of materials meeting the special requirements imposed by the storage of this type of product, in particular the low temperatures, about −160° C. in the case of methane, at which liquefied gases are stored.

The principal properties which the materials used in the construction of such containers are required to have are as follows: (i) adequate mechanical strength at very low temperatures, (ii) absence of brittleness at very low temperatures, (iii) a very low coefficient of thermal expansion between room temperature and the temperature of use, (iv) good formability, and (v) good weldability by a variety of welding procedures.

One of the materials that has been acknowledged to constitute a good compromise between these various requirements is iron-nickel alloy containing 36% nickel and sold under the trademark "Invar." This alloy has been used for the construction of tanks forming an integral part of the hull of a ship; the tanks have been tested and have given good results.

Manufacturing tests have shown that one of the difficulties in using this material is the production of good welds characterised by the absence of cracks in the welded joints, the absence of cracks in the zones of the alloy affected by heat during welding, i.e. the zones adjacent to the welded joint, and the maintenance in the welded joints and the zones affected by heat of metallurgical characteristics and physical properties similar to those of the base metal.

Cracks in the welded joint may be prevented by careful choice of the filler metal if used or by precise control of the welding conditions when a filler metal is not used.

The occurrence of cracks in the heat-affected zones is more difficult to prevent. It is often due to brittleness of the base metal at temperatures higher than 500° C. During welding, the base metal is subjected to considerable stress. If the metal is ductile, this stress does not have serious consequences, but when the metal is brittle it may cause breaks. If a ferro-nickel alloy containing 36% nickel is prepared with special precautions, it has a heat-brittleness range that is shown in the rapid-drawing test by a minimum of elongation and reduction of cross-sectional area at break. This minimum is in the temperature range of 600° to 1000° C.

Figure 1:
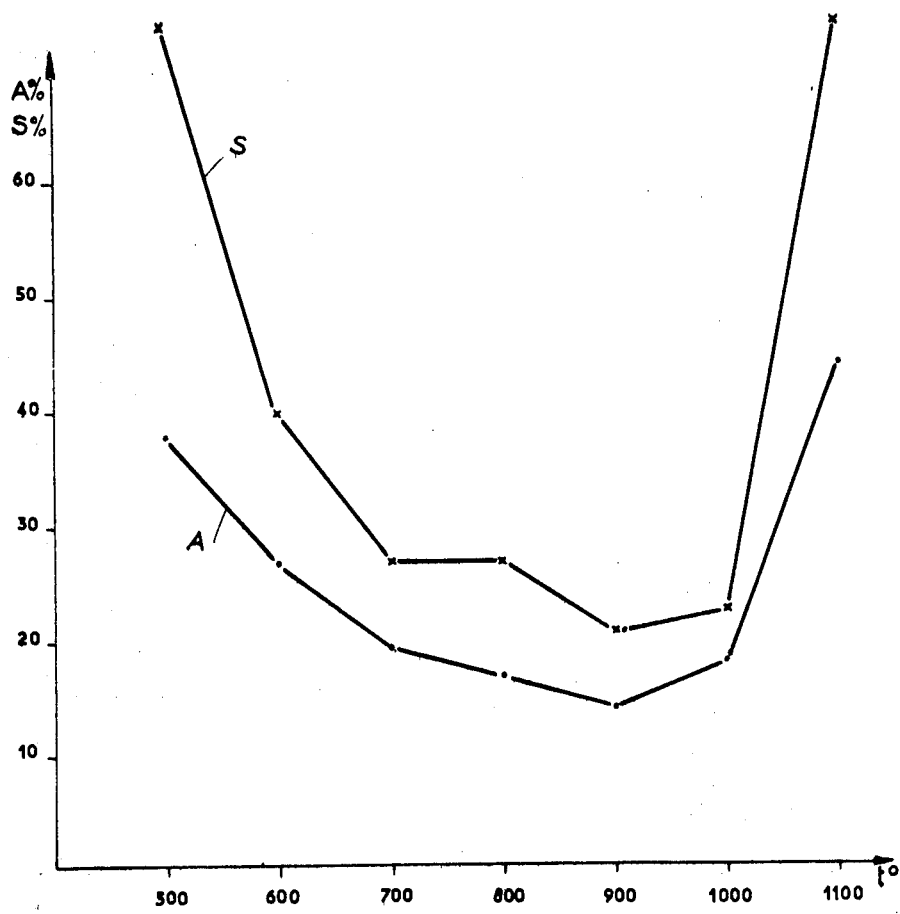
FIG. 1 of the accompanying drawing shows two curves. Curve A shows the percent elongation at break of a known ferro-nickel containing 36% nickel, plotted against the temperature and curve B shows the percent reduction in cross-sectional area at break for the same alloy, plotted against the temperature.

The brittleness shown by the minima of the curves of FIG. 1 at about 600° to 1000° C. may cause certain difficulties in welding during the manufacture of containers for the storage or transport of liquefied gases. The curves of FIG. 1 were obtained from tests of a drawn bar treated, before tests by hot traction, by heating the bar for one hour at 1100° C. followed by cooling in air and then working. Analysis of the casting so used was:

| | |
|---|---|
| C | 0.028 |
| Si | 0.12 |
| S | 0.084 |
| P | 0.016 |
| Mn | 0.42 |
| Ni | 35.58 |
| Cr | 0.05 |
| Cu | 0.07 |
| Mo,U | Traces |
| $N_2$ | 0.0029 |
| $O_2$ | 0.0042 |
| Fe | Remainder |

This hot-shortness has been linked with the sulphur content of the metal when it exceeds 0.002%. It has been proposed to remedy this by rigorous desulphurisation which may use the desulphurising action of uranium, which for example, in the case of "Invar" containing 36% nickel, is added in a low enough proportion for the coefficient of linear expansion of the alloy not to be affected.

It is also known to use a filler metal for welding which contains manganese and titanium so that several percent of each of these elements are added to the base ferro-nickel. This has the serious disadvantage that it raises prohibitively the coefficient of linear expansion of the alloy.

Whatever method is adopted to limit the effects of the presence of sulphur, the fact remains that the hot-shortness also depends on the state of crystallisation of the metal. Coarse crystallisation promotes lack of cohesion between the grains due to hot-stressing.

DESCRIPTION OF THE PREFERRED EMBODIMENTS

I have now developed modified iron-nickel alloys with a high nickel content which are not subject to coarse crystallisation in heat-affected zones during welding and which have substantially the same coefficient of thermal expansion as the unmodified alloys.

According to the present invention, I provide an iron-nickel alloy containing at least 30% nickel, said alloy having distributed therethrough a fine dispersion of a nitride of at least one of the elements, vanadium, titanium, zirconium and niobium.

The nitride constitutes an insoluble phase in the alloy and, in the form of a fine dispersion, it prevents or reduces recrystallisation of the alloy on heating and thus prevents coarse crystallisation of the alloy and the formation of coarse grains. The presence of the insoluble nitride dispersion also reduces embrittlement due to the presence of sulphur in the alloy.

The alloys according to the invention preferably contain from 0.02 to 0.1% of the nitride-forming element or elements. Vanadium is the preferred nitride-forming element.

It has also been found that the presence of the insoluble nitride phase, when its quantity is correctly adjusted, does not modify the coefficient of linear expansion of the alloys.

The nitride-forming elements which have a strong affinity for elements other than nitrogen, for example carbon, should be used in a proportion such that sufficient nitride-forming element is present to combine with nitrogen to form nitride as well as forming compounds, such as carbides, with such other elements.

The alloys according to the invention can be made by conventional procedures; the nitrogen required to form the nitride will normally be nitrogen already present in the alloy, but, if necessary, nitrogen can be added before, during or after the addition of the nitride-forming element or elements to the melt.

Figure 2:
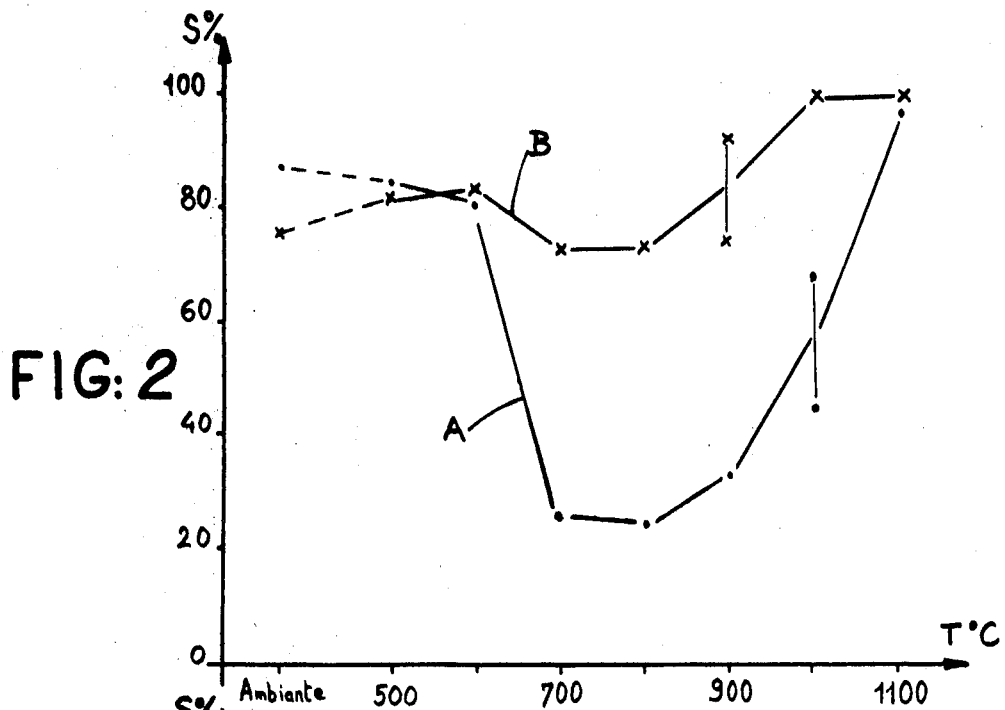
FIG. 2 shows curves similar to those of FIG. 1, curve A representing a known alloy and curve B representing an alloy of the present invention containing zirconium.

Referring now to FIG. 2, two castings of 10 kg. each were made under vacuum, as two alloys A and B.

Alloy A is a known alloy while alloy B includes a certain amount of zirconium in accordance with the present invention. The compositions of the two alloys when cast were:

Alloy A:                                                                    P.p.m.
    C ------------------------------------------- 0.005
    Si ------------------------------------------ 0.08
    S ------------------------------------------- 0.002
    P ------------------------------------------- 0.01
    Mn ------------------------------------------ 0.2
    Ni ------------------------------------------ 36.48
    Zr ------------------------------------------ ---
    $N_2$ ----------------------------------------- 8

Alloy B:
    C ------------------------------------------- 0.04
    Si ------------------------------------------ 0.1
    S ------------------------------------------- 0.002
    P ------------------------------------------- 0.006
    Mn ------------------------------------------ 0.26
    Ni ------------------------------------------ 36.10
    Zr ------------------------------------------ 0.04
    $N_2$ ----------------------------------------- 12

Casting B differs from casting A only in the addition of zirconium, the other elements being equivalent.

The addition of zirconium is between the limits of 0.02 to 0.1 within the scope of the present invention.

The addition of zirconium does not change the properties of expansion of the alloy. Alloy B, forged, annealed for one hour at 850° C. and tempered in oil, had a mean coefficient of expansion between −196° C. and ambient temperature, about 20°, of $1.38 \times 10^{-6}$.

Alloy A under the same conditions, was $1.23 \times 10^{-6}$.

FIG. 2 shows as a function of temperature on the abscissa, the variation of elongation at break on the ordinant of a forged alloy annealed for one hour at 1100° C. and tempered in oil.

A comparison of curves A and B corresponding to alloys A and B show that the addition of zirconium (curve B) practically removes the drop in ductility observed for alloy A between 600 and 1000° C.

With the removal of the drop in ductility in alloy B is a considerable reduction in the size of the grain. The thermal treatment for one hour at 850° C. discussed above for measuring the coefficient of expansion produced the following variations of grain ASTM:

Alloy A: ASTM 7
Alloy B: ASTM 11

The presence of zirconium nitride was identified in casting B/by X-ray diffraction.

When Alloy A was used for welded constructions, cracks appeared along the welds while with alloy B excellent welding took place, with no cracks in the welding zone, thus establishing the decrease of the drop in ductility as seen in FIG. 2.

Figure 3:
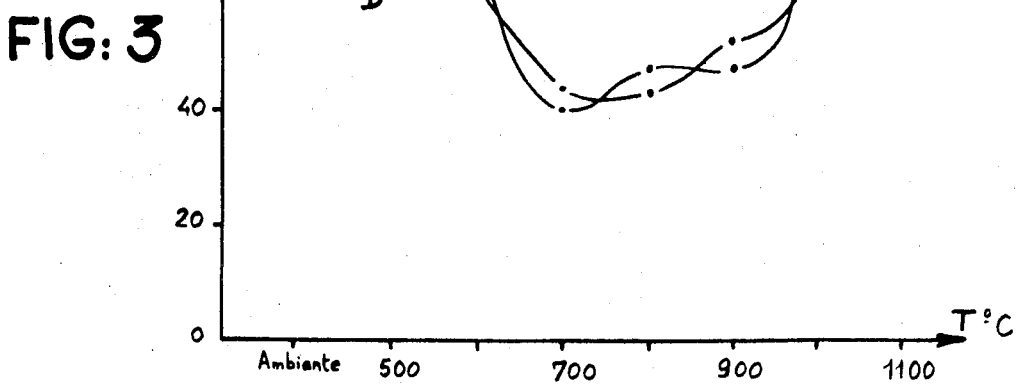
FIG. 3 shows curves for alloys of the present invention containing titanium.

Referring now to FIG. 3, FIG. 3 is a diagram showing the results of the addition of about 0.10% of titanium on the ductility determined by stretching of heated specimens of two alloys containing, respectively, 14 and 66 p.p.m. of nitrogen and having the following analysis:

Alloy C:                                                                    P.p.m.
    C ------------------------------------------- 0.026
    Si ------------------------------------------ 0.09
    S ------------------------------------------- 0.001
    P ------------------------------------------- 0.007
    Mn ------------------------------------------ 0.26
    Ni ------------------------------------------ 36.10
    Ti ------------------------------------------ 0.12
    $N_2$ ----------------------------------------- 14
    Fe ------------------------------------------ Remainder Alloy D:
    C ------------------------------------------- 0.034
    Si ------------------------------------------ 0.09
    S ------------------------------------------- 0.002
    P ------------------------------------------- 0.007
    Mn ------------------------------------------ 0.27
    Ni ------------------------------------------ 36.02
    Ti ------------------------------------------ 0.09
    $N_2$ ----------------------------------------- 69
    Fe ------------------------------------------ Remainder The stretch at 700–800° C. is about 45%, slightly more than the stretch of iron-nickel alloys with 36% nickel and no addition of V, Ti, Zr or Nb.

FIG. 3 shows the improvement caused by a small amount of titanium (0.10%) involving no change of expansion.

What I claim is:

1. An iron base alloy consisting essentially of at least 30% nickel, from 0.02 to 0.1% of at least one element selected from the group consisting of vanadium, titanium, zirconium, and niobium, and the balance iron, said alloy having distributed therethrough a fine dispersion of a metal nitride of at least one of said nitride forming metals.

2. An iron base alloy consisting essentially of about 36% nickel, from 0.02 to 0.1% vanadium, and the balance iron, at least a part of the vanadium being present in the form of a fine dispersion of vanadium nitride.

References Cited

UNITED STATES PATENTS 2,048,163  7/1936  Pilling --------------- 148—31
3,184,346  5/1965  Fiedler ------------ 148—31.55

L. DEWAYNE RUTLEDGE, Primary Examiner

J. E. LEGRU, Assistant Examiner

U.S. Cl. X.R.

75—123J, 123K, 123M, 128